United States Patent [19]
Hoffstedt

[11] 3,910,105
[45] Oct. 7, 1975

[54] METHOD FOR DETECTION OF FLAWS IN COMPOSITE FIBERGLASS STRUCTURES

[75] Inventor: Donald J. Hoffstedt, Drexel Hill, Pa.

[73] Assignee: The Boeing Company, Seattle, Wash.

[22] Filed: Aug. 16, 1974

[21] Appl. No.: 497,996

[52] U.S. Cl............. 73/88 A; 116/DIG. 5; 340/380
[51] Int. Cl.² ........................................ G01N 21/00
[58] Field of Search............ 73/88 A, 88 R; 356/32; 250/227; 340/380; 116/DIG. 5, DIG. 26; 350/96 R

[56] References Cited
UNITED STATES PATENTS
3,588,811  6/1971  Prickett .......................... 340/380 X
3,777,154  12/1973  Lindsey ......................... 350/96 R X OTHER PUBLICATIONS
Donath, E. Testing Optical Fibers, IBM Technical Disclosure Bulletin, Vol. 8, No. 6, Nov. 1965.

Primary Examiner—Jerry W. Myracle
Attorney, Agent, or Firm—Joseph M. Corr

[57] ABSTRACT

A method for detecting structural flaws in filamentary reinforced composite structures is described. A plurality of optical lead glass or other suitable "light-piping" filaments are positioned within the structure during manufacture, such that the ends of the filaments are accessible when the structure is complete. A failure, or flaw, within the structure traversed by the lead glass filaments will sever the lead glass filaments. A severed glass filament will not "pipe" light, as it did before the discontinuity occurred. This change can be detected during an inspection procedure which consists of applying a light source to one end of the filament, and monitoring the light output at the other end of the filament. The position of the lead glass filament within the structure can be ascertained by radiographic inspection. The modulus of elasticity of the optical filament is matched with the elastic modulus of the structural filaments to optimize the detection of flaws.

3 Claims, 3 Drawing Figures

METHOD FOR DETECTION OF FLAWS IN COMPOSITE FIBERGLASS STRUCTURES

BACKGROUND OF THE INVENTION

The use of fiberglass and other filamentary reinforced plastic materials as load-bearing structure is becoming increasingly common in applications where high strength and low weight, coupled with flexible design geometry, is important. While the use of composite materials in such structures offers significant advantages over the more conventional materials previously employed, composite materials pose new problems in the detection of structural flaws, since the flaw detection equipment usually employed with conventional materials cannot be used successfully with fiberglass composite materials. For example, magnafluxing, which is commonly used to detect flaws in metal structures, cannot be used to detect flaws in composite fiberglass structures. In some applications, such as the use of fiberglass composite materials in structural members of aircraft, safety considerations require that a reliable and economical structural - integrity detection system exist if composite materials are to be used with confidence. The nature of the flaw detection system employed depends in some measure upon the process used to mold the fiberglass material into the end product. This can be accomplished in a variety of ways. One method frequently used is to coat parallel aligned uniformly spaced filaments with resin or a plastic matrix material and then, after allowing the plastic to become partially cured, applying it in continuous sheets or narrow tape widths about an appropriate mold shaped to the desired end product. In this manner the fiberglass filaments are built-up about the form and upon themselves in successive layers. The filaments in a particular layer are thus parallel to each other and are usually aligned at different angles from filaments of adjoining layers. After the structure is cured, its strength results largely from the ability of individual filaments of the structure to bear tensile loads. In use, it is possible for one, or several, of these individual filaments to break which weakens the overall structure in the vicinity of the break, or flaw. It should be noted that this weakness of the structural member is confined largely to the immediate vicinity of the discontinuity of the filament, since the resin or plastic adhesive used to join the filaments together prevents significant lateral displacement of the severed filament. This flaw in the structure which often results from fatiguing of individual filaments causes the load reaction to redistribute and places increased tensile loads on the filaments immediately adjacent to the break. This may ultimately result in breaks of adjoining filaments, and catastrophic failure of the entire structure may occur. It is thus important that a flaw detection system be employed for any fiberglass composite material structure subject to high loads or external damage, where catastrophic failure of the structure presents a significant safety hazard. A practical flaw detection system must be nondestructive (as opposed to destructive tests which are sometimes employed to analyze statistical samples from a large number of similar items being manufactured) and be economical and reliable. Further, in application where weight is a significant consideration, the installed weight of the detection system should be kept as low as possible. Ideally, the detection system contributes to the overall strength of the structure.

SUMMARY OF THE INVENTION

This invention is directed to providing a structural flaw detection system for filamentary reinforced composite structures which is economical, reliable, and practical, with particular applicability to aircraft composite structures. The invention consists of interleaving strands of optical lead-glass fibers or other light-piping fibers with other strands of fibers which make up a filamentary reinforced composite structure. A failure of the structure will sever optical fibers passing through the failure site. This failure can be detected during subsequent inspection since the severed optical fibers will not transmit light. The optical fibers are so arranged within the structure that the critical load paths of the overall structure can be monitored by directing light through a relatively small number of inspection points provided for this purpose. The optical fiber performs the dual function of making up a portion of the composite structure and providing a built-in failure detection capability. The elastic modulus of the optical fiber is optimized to provide highly reliable failure detection when used in conjunction with conventional fiberglass and other filamentary reinforced composite materials.

It is the principal object of the invention to provide a built-in structural flaw detection system for filamentary reinforced composite structures.

Another object of the invention is to provide a composite structural failure detection system as an integral part of the structure.

Another object is to provide a composite flaw detection system which is economical, practical and reliable enough to rely upon for structural members of vehicles.

Another object of the invention is to provide a composite structural flaw detection capability which can be oriented within the structure to provide localized surveillance for flaws in volumes within the structures which are most susceptible to failure.

Another object of the invention is to provide a flaw detection system which can be monitored for continuity after installation, by radiographic techniques.

These and other objects of the invention will become more readily apparent from the ensuing specification when taken with the drawings.

DESCRIPTION OF THE PREFERRED EMBODIMENT

The structural flaw detection method of this invention can be used with any composite structure but it is particularly applicable to highly stressed aircraft structures where structural integrity is vital. Accordingly, the use of this method in a helicopter rotor will be described, it being appreciated that this method has wide applicability to other composite structures.

Figure 1:
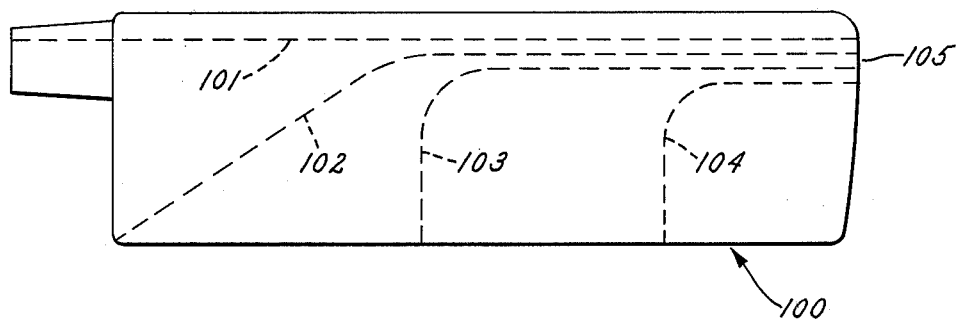
FIG. 1 is a top plan view of the present invention, applied to a helicopter rotor.

FIG. 1 is a plan view of a helicopter rotor blade. During the molding of the overall structure, 100, lead glass filaments 101, 102, 103, 104 are oriented in the structure as shown. The number and orientation of these lead glass fibers is subject to variation, depending upon the structural volume of particular concern. As will be discussed below, the purpose of these lead glass filaments is to provide an indication of flaw in the structure, utilizing the principle that when the filaments are severed no light can be "piped" from one end of the filament to the other. Accordingly, these filaments are arranged in any manner desired during the molding of the structure so long as both ends of the filaments are accessible for inspection, and the filaments are not "crimped" or bent into a radius too small to permit light from "piping" from one end of the filament to the other. If the optical filaments are damaged, but the structure is still usable, it is possible to bond new optical filaments to a completed structure.

Groups of the lead glass filaments are terminated at a central location 105, flush with an outside end of the structure, to faciliate application of an inspection light source (not shown) during the inspection procedure. This light source can be any convenient source, such as a flashlight. The other ends of the lead-glass filaments terminate at various points along the structure, also flush with the edge of the structure, as shown. The path of lead-glass filaments is designed to pass the filaments through the structural volume of most interest, that is, the structural volume where the detection of flaws is most important.

Figure 2:
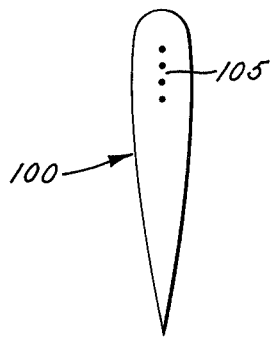
FIG. 2 is an end view of a helicopter rotor blade incorporating the present invention.

FIG. 2 is an end view of the rotor blade, showing the ends of the lead-glass filaments 101, 102, 103 and 104 terminating flush with the edge of the blade at a central point 105.

Figure 3:
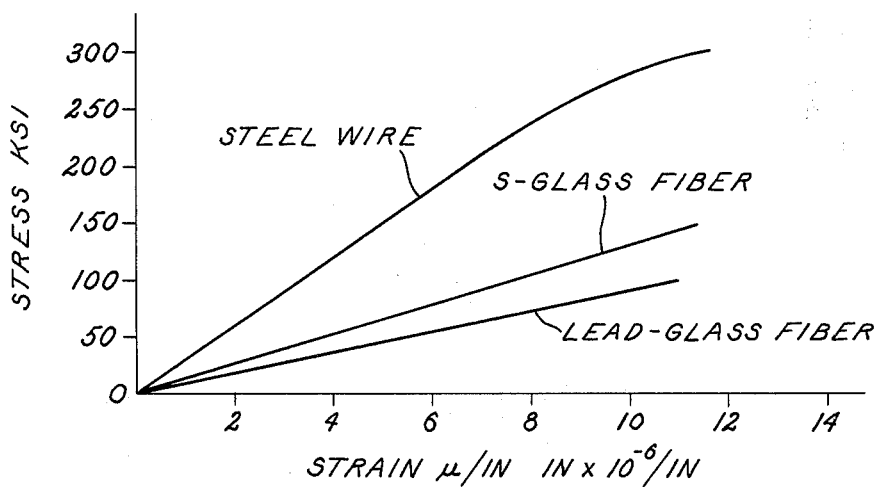
FIG. 3 contains stress strain curves for lead-glass filaments, S-glass filaments, and steel.

FIG. 3 is a graphical representation of the modulus of elasticity of the lead-glass filaments used in the flaw detection process, and the S-glass filaments which make up the structure. It should be noted that the deformation characteristics of the two filaments are very similar. This is significant since it is important that the flaw detection filament and structural filament fail under similar loads. The deformation curve for a steel filament is also shown on the graph for comparison. Note that the use of a metal flaw detection filament (failure could be measured electrically by detecting an open circuit during an inspection process) is not optimum for detection of flaws in a fiberglass composite structure because the metal filament, being considerably stiffer then the structure, will not fail under the same loads as the structure. In general, the metal filament would fail before the fiberglass structure, thus giving a false indication of a flaw in the structure.

The installed lead-glass filaments can be inspected, after assembly, by radiograhic techniques, to insure that they are located properly since the lead-glass filaments are visible on x-ray.

The lead glass filaments, once installed in the structure, are utilized during the inspection process by applying a light source, such as an ordinary flashlight, to one end of the filament and monitoring the other end for "piped" light output. A severed filament will not pipe light. If no light output is present, this structure can be further nondestructively tested by radiographic, ultrasonic, infrared or other non-destructive technique to determine where the discontinuity has occurred. This inspection process is particularly applicable to aircraft structures at remote operating sites, since it can be accomplished with only a minimum of equipment (a flashlight) in a very short period of time. Further, as described above, the method is very reliable.

The advantages of this invention can be summarized as follows:

1. No weight penalty, since the inspection is a part of the structure.
2. No secondary flaw detection system is required.
3. The lead glass filaments used to detect flaws fail under loads which cause a failure in the basic structure.
4. The system can be inspected radiograhically to insure that the lead-glass fibers are properly installed within the structure.
5. The inspection process is fast, reliable, and requires a minimum of equipment.

This invention may be further developed within the scope of the following attached claims. Accordingly, the foregoing description should be read as merely descriptive of an operative embodiment of my invention and not in a strictly limiting sense.

I claim:

1. A method of detecting structural flaws in a composite filamentary reinforced plastic structure comprising the steps of:
    a. Placing optical filaments, within the filamentary reinforced structure in such a manner that the ends of the optical fibers are accessible as inspection points and light source points;
    b. Subjecting the structure to loads;
    c. Removing the loads;
    d. Applying a light source to the light source end of the optical fibers;
    e. Monitoring the light output at the inspection end of the optical fibers being illuminated;
    f. Identifying discontinuities of the optical filament, by noting which filaments do not conduct light from the light source point to the inspection point.

2. The method according to claim 1 comprising the additional step after step (f) of examining the overall filamentary reinforced composite structure with radiographic equipment to isolate the site of discontinuity of the severed lead glass fiber.

3. The method according to claim 1 comprising the additional step before step (a) of selecting fibers with a modulus of elasticity similar to that of the basic composite structure.

* * * * *